Oct. 30, 1951 G. E. HENNING 2,573,439
RETRACTILE CORD AND METHOD OF MAKING RETRACTILE CORDS
Filed Jan. 7, 1947
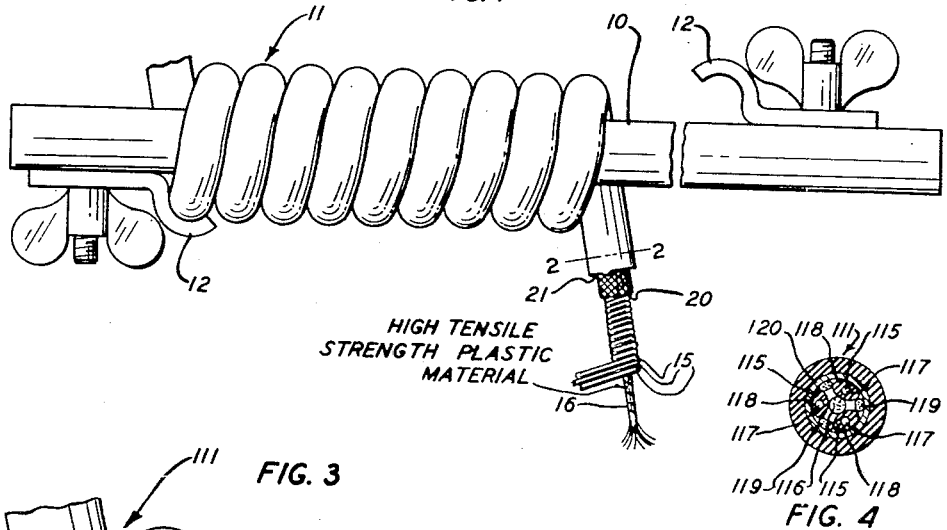
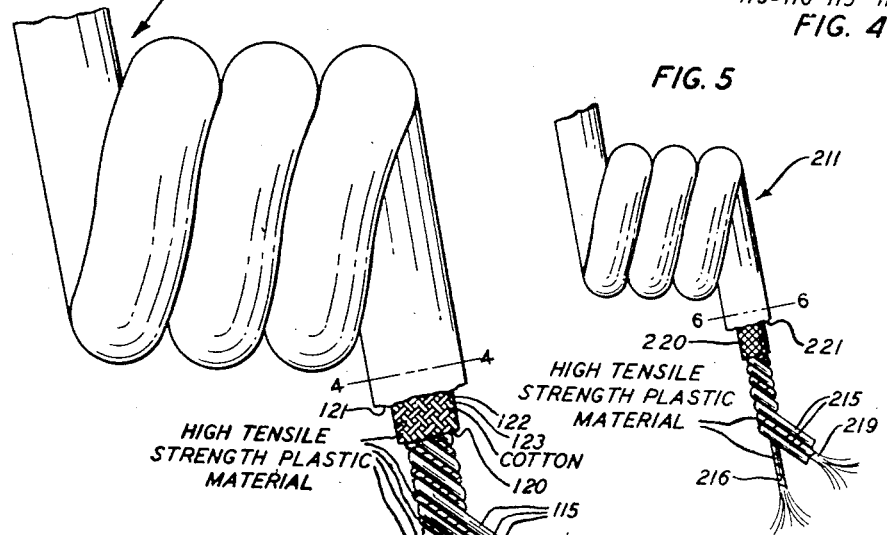
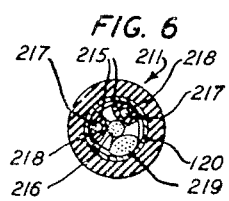
INVENTOR
G.E. HENNING
BY
ATTORNEY

Patented Oct. 30, 1951

2,573,439

UNITED STATES PATENT OFFICE 2,573,439

RETRACTILE CORD AND METHOD OF MAKING RETRACTILE CORDS

George E. Henning, Baltimore, Md., assignor to Western Electric Company, Incorporated, New York, N. Y., a corporation of New York Application January 7, 1947, Serial No. 720,671

16 Claims. (Cl. 174—69)

This invention relates to retractile cords and methods of making retractile cords, and has for its objects the provision of new and improved retractile cords and the provision of new and improved methods of making retractile cords.

A retractile cord forming one embodiment of the invention is made by incorporating at least one strand of flexible thermoplastic material in a cord, coiling the cord containing the strand into a close helix, heating the cord and cooling the cord to set the thermoplastic strand in the form of a helix. The thermoplastic strand then tends to hold the cord in a helical form, but permits the cord to be extended when tension is imparted thereto.

A complete understanding of the invention may be obtained from the following detailed description of cords and methods of making cords constituting specific embodiments thereof, when read in conjunction with the appended drawing, in which:

Fig. 1 is a fragmentary view of a retractile cord constituting one embodiment of the invention, while in the process of being made in accordance with a method embodying the invention;

Fig. 2 is an enlarged section taken along line 2—2 of Fig. 1;

Fig. 3 is an enlarged, fragmentary view of a cord forming another embodiment of the invention;

Fig. 4 is a section taken along line 4—4 of Fig. 3;

Fig. 5 is a fragmentary view of a retractile cord forming a third embodiment of the invention;

Fig. 6 is an enlarged section taken along line 6—6 of Fig. 5, and

Fig. 7 is a reduced section of an apparatus for heating retractile cords embodying the invention.

Referring now in detail to the drawing, there is shown in Fig. 1 a cord 11 in the process of being formed into a retractile cord. The cord 11 includes a plurality of insulated conductors 15—15 wound with a short pitch around a central strand 16, which is composed of a plurality of high tensile strength monofilaments of a thermoplastic material. In this particular embodiment of the invention, the central strand 16 is composed of a plurality of monofilaments of polymerized vinylidene chloride ("Saran").

The insulated conductors 15—15 include stranded conductors 17—17 and coverings 18—18, which are composed of an insulating material, such as a vulcanized rubber or synthetic rubber-like compound. Among the rubber-like materials that may be used in such insulating compounds are polymerized chloroprene ("neoprene") and Buna S.

A braided covering 20, which may be made of cotton strands, or cotton strands and strands of "Saran," encloses the insulated conductors 15—15 and the central strand 16. The braided covering 20 is covered with a jacket 21 composed of a suitable weather-proofing material, such as a vulcanized rubber or synthetic rubber-like compound, for example, "neoprene."

In forming the cord 11 into a substantially permanently retractile form, the cord is wound in a close helix upon a mandrel 10 and is secured thereon by clamps 12—12. The mandrel and the helically wound cord then are placed in a hot oven 22, which heats the central cord 16 to a temperature at which the thermoplastic material of which it is composed softens enough to cause the cord 16 and the binding 20 to assume the shape it occupies in the close helix. Satisfactory results were obtained when a coiled cord with "Saran" strands therein was heated to a temperature of about 260° F., although a lower or slightly higher temperature may be used. Obviously, the thermoplastic material should not be heated to its melting point. After the cord is heated, the mandrel with the cord thereon is withdrawn from the oven and the cord is allowed to cool while still clamped on the mandrel. When cool, the cord 11 is taken off of the mandrel and may be put into service in any desired manner, such as in conjunction with a telephone instrument, or the like.

The central strand 16 then will be set in a helical shape and will tend to retain the cord 11 in a close helix. This helix may be extended by pulling the ends of the cord 11, but whenever the cord 11 is not under tension, the central strand 16, which is composed of the high tensile strength thermoplastic material, tends to maintain the cord 11 in a close helix.

It will be noted that the insulated conductors 15—15 are wound upon the central strand 16 with a left hand lay, while the completed cord 11 is wound upon the mandrel 10 with a right hand lay. With this construction, the conductors 15—15 tend to unwind as the coiled cord is extended and, therefore, the conductors offer the least resistance to the extension of the cord.

Although the braided covering 20 may be made of cotton, it preferably consists of cotton strands and strands made of high tensile strength monofilaments of a thermoplastic material of the type described hereinabove. In the latter case, all the cotton strands extend in one direction and all the plastic strands in the opposite direction. When it is desired to make a cord that is as extensible as possible, the plastic strands extend in such a direction that they would tend to unwind when the coiled cord is extended. In that case, the plastic strands would be braided with a left hand lay around the central strand 16 and would run in the same direction as the conductors 15—15. With such a structure, the plastic strands also are set by the heat treatment and aid the plastic central strand 16 in maintaining the coiled cord in a close helix while permitting the cord to be extended most readily.

The central strand 16 and such a binding 20 give a high degree of retractility to the cord 11, which has a relatively soft pull, that is, it may be extended relatively easily. However, whenever the tension is removed from the extended cord, the central strand 16 and the binding 20 return the cord to the form of a close helix. The vulcanized rubber or rubber-like insulating compounds in the coverings 18—18 and the jacket 21 may also be set in helical form when the monofilaments are set by heat, and also may aid in causing the cord to be retractile.

The central strand 16 also serves as a filler element for the insulated conductors 15—15 so that these conductors may be wound thereon with a close lay to provide a high degree of flexibility to the cord 11. The braided covering 20, in addition to its function of maintaining the cord 11 in the form of a close helix, also serves to hold the insulated conductors 15—15 in place upon the central strand 16.

The cord just described has great extensibility, yet it is sufficiently retractile to cause it to return repeatedly to its original coiled form from an extended position. If it is desired to make the cord more resistant to extension when it is tensioned, the conductors 15—15, or the plastic strands in the braided covering 20, may be caused to extend in a direction opposite to that described hereinabove, that is, with a right hand lay. Obviously, to obtain the greatest resistance to extension, both the conductors and the plastic strands in the covering would be caused to extend in such direction as to be tightened up as the cord is extended. Alternatively, the cord with left hand lay conductors and strands could be wound upon the mandrel with a left hand lay and set in that form to accomplish the same purpose.

A retractile cord 111 constituting an alternative embodiment of the invention is shown in Figs. 3 and 4, and includes three individually insulated conductors 115—115 served around a central strand 116, which is identical with the central strand 16 (Fig. 1). The insulated conductors 115—115 include stranded conductors 117—117 having vulcanized insulating covers 118—118 thereon. Three filler strands 119—119, which are composed of the same material as the central strand 116, alternate with the insulated conductors 115—115. The insulated conductors 115—115 and the filler strands 119—119 are wound with a close, right hand lay upon the strand 116. A braided covering 120 serves to hold the insulated conductors 115—115 and the filler strands 119—119 in place upon the central strand 116. A vulcanized weatherproofing jacket 121 encloses the binding 120. The covering 120 is composed of cotton strands 122—122 and plastic strands 123—123 made of the same material as the strands 116 and 119—119.

The cord 111 is formed by serving the insulated conductors 115—115 and the filler strands 119—119 upon the central strand 116 with close, right hand lays, and forming the braided covering 120 and the weatherproofing jacket 121 thereover. In forming the braided covering 120, the plastic strands 123—123 run in the same general direction as the filler strands 119—119. The cord 111 then is wound in a close helix on a mandrel, and is clamped thereon, after which the cord is subjected to the same heat treatment that was employed in connection with the cord 11.

By this treatment, the plastic strands in the covering 120 and the strands 116 and 119—119 of the cord 111 are set in the close helical form which they occupy on the mandrel. The covering 120 and the strands 116 and 119—119 maintain the cord 111 in the form of a close helix except while the cord is extended whenever it is placed under tension during the use thereof. The filler strands 119—119 add retractility to the cord 111 and effect a saving in the length of the insulated conductors 115—115 per unit of length of the cord 111.

It will be noted that the conductors 115—115, the filler strands 119—119 and the strands 123—123 tend to resist extension of the cord. If it is desired to increase the extensibility of the cord, some or all of these elements would be caused to run in the opposite direction.

A cord 211 (Figs. 5 and 6) forming still another embodiment of the invention includes a pair of individually insulated conductors 215—215 served around a central strand 216, which is identical with the central strands 16 and 116. The insulated conductors 215—215 include stranded conductors 217—217, which are covered by vulcanized insulating covers 218—218. A filler strand 219 identical with the filler strands 119—119 is served around the central strand 216 between the insulated conductors 215—215, as the conductors are served around the strand 216. A braided covering 220, which is identical with the braided covering 120, and a weatherproofing jacket 221, respectively, enclose the insulated conductors 215—215 and the filler strand 219.

In making the retractile cord 211, the filler strand 219 and the insulated conductors 215—215 are served upon the central strand 216 in the same direction with a close lay. The covering 220 is braided thereover and the jacket 221 is formed over the binding 220 to complete the cord 211. The cord 211 then is wound upon a mandrel in the form of a close helix, and is clamped in that form upon the mandrel. The same heat treatment that was given to the cord 11 is applied to the cord 211, and, as a result, the plastic strands in the covering 220 and the strands 216 and 219 are set in the forms which they occupy in the close helix.

The cord 211 is highly retractile due to the helical strands 216 and 219 and the plastic strands in the covering 220. However, the cord may be easily extended with a relatively light pull. Because of the filler strand 219, the cord 211 has less lengths of the insulated conductors 215—215 per unit length of the cord 211 than would be the case if the filler strand 219 were not present. Thus, the filler strand 219 effects a considerable saving in the lengths of the conductors, as well as adding to the retractility of the cord 211.

While in the foregoing specific embodiments of the invention the primary retractile elements of the retractile cords described therein are strands composed of monofilaments of polymerized vinylidene chloride ("Saran"), these retractile elements may be made of monofilaments of other thermoplastic materials. Thus, for example, the ordinary "nylon" of commerce (polyhexamethylene adipamide) may be formed into monofilaments, in which the material is oriented by cold drawing. The resulting monofilaments may be formed into strands that may be used with satisfactory results as retractile elements in accordance with the teachings of this invention. Such strands, when heated in helical form to a temperature of about 300° F. and cooled, form retractile elements that tend to keep cords incorporating them in helical shape.

These and other related compounds which may be drawn into oriented monofilaments are intended to be included within the meaning of the terms "monofilamentary plastic," "monofilaments of thermoplastic material," and the like, used herein and in the annexed claims. Specific materials that may be employed for the purposes of this invention in place of polymerized vinylidene chloride are those high molecular weight polymers disclosed in Patents 2,071,250, 2,130,523, 2,374,136, 2,386,454, 2,388,319, and 2,393,972, which are capable of being drawn into fibres having high tensile strength, which melt at temperatures well above those to which retractile cords will be subjected in ordinary service, and which may be set by heating into helical form.

If desired, the monofilamentary thermoplastic strands employed as center straids, filler strands and as elements of the braided coverings, may be replaced by composite strands made up of thermoplastic monofilaments and filaments of other textile materials. For example, composite strands made of cotton and thermoplastic monofilaments may be used.

Other expedients may be employed, if desired, to increase the retractility of the cords. For example, the cords may be turned inside out to reverse the convolutions of the helix in which the cord is set. In certain cases this has the effect of placing the convolutions in close proximity to each other. Alternatively, the cord may be twisted about its longitudinal axis as it is being wound in helical form upon a mandrel prior to being heat treated. In either case, the conductors, any thermoplastic filler strands and any thermoplastic strands in the braided covering should extend in such directions as to aid rather than diminish the retractility of the finished cord. As pointed out previously, the extensibility of the cord may be controlled to a considerable extent by varying the direction in which the cord is wound upon the mandrel and the direction in which the conductors, plastic filler strands and plastic braided strands extend.

In the embodiments of the invention described hereinabove, the covering, such as the covering 20, which surrounds the insulated conductors is braided. If desired, a suitable covering may be made by serving cotton strands or monofilamentary strands over the conductors, or over the conductors and filler strands when filler strands are used. Obviously, the covering may consist of a serving made of both cotton and monofilamentary strands. Where strands made of monofilaments of thermoplastic materials are served over the conductors and any filler strands that may be present to form a covering, they will be served in such direction as to impart the desired retractility and extensibility to the finished cord.

The fact that the conductors are served helically with a close lay upon a central strand makes cords embodying the invention very flexible. Yet, despite their flexibility, they are highly retractile and return repeatedly to their original position after having been extended and released. Because of these features, such cords are useful over long periods of time where these characteristics are advantageous and especially in the communications field.

What is claimed is:

1. A retractile cord, which comprises a center strand, a plurality of insulated, flexible conductors wound in a close helix upon the center strand, and a covering of strands enclosing the conductors and the center strand, at least one of said strands consisting of a thermoplastic material, said cord being wound in the form of a close helix with all thermoplastic strands in said cord set in the forms they occupy in said helix to render the cord retractile.

2. A retractile cord made of a length of cordage which comprises a flexible thermoplastic center strand, a plurality of insulated, flexible conductors wound in a close helix upon the center strand, and a covering comprising thermoplastic strands enclosing the conductors and the center strand, said length of cordage being wound in the form of a close helix with all the thermoplastic strands set in the forms they occupy in said helix to render the cord retractile.

3. A retractile cord, which comprises a central strand, a plurality of conductors wound upon the central strand with a close lay, a flexible thermoplastic filler strand wound around the central strand parallel with and in a position between two of the conductors, and a covering enclosing the filler strand and the conductors to form therewith a cord, said cord being coiled into a close helix and said filler strand being set in the form it occupies in the helix.

4. A retractile cord, which comprises a central strand, a plurality of conductors, a filler strand comprising thermoplastic monofilaments, said conductors and said filler strand being served upon the central strand with a close lay, and a cover enclosing the conductors and the filler strand to form a cord therewith, said cord being coiled into the form of a close helix and said filler strand having been heated and cooled while the cord is in said helical form so that the filler strand is set in the form it occupies in the helix.

5. A retractile cord, which comprises a center strand composed of thermoplastic monofilaments, a plurality of conductors wound together over the center strand with a close lay, and a plurality of cotton strands and strands composed of thermoplastic monofilaments interbraided into a covering over the conductors, said cord being coiled into the form of a close helix and said monofilamentary strands having been heated and cooled while in the positions they occupy in said form to set them in those positions.

6. A retractile cord, which comprises a center strand, a plurality of conductors served upon the center strand in a close helix, and a plurality of cotton strands and strands of thermoplastic monofilaments braided into a covering over the conductors, said cord being coiled in a close helix, said monofilamentary strands having been set in the form they assume in said helix and said braided monofilamentary strands and conductors extending in such direction as to impart a predetermined degree of extensibility to the cord.

7. A retractile cord, which comprises a center strand composed of thermoplastic monofilaments, a plurality of insulated conductors and filler strands composed of thermoplastic monofilaments served in a close helix upon the center strand, and a plurality of cotton strands and strands composed of thermoplastic monofilaments braided into a covering over the conductors and filler strands, said cord being coiled in a close helix and all of said monofilamentary strands having been set in the positions they occupy in said helix.

8. A retractile cord, which comprises a center strand, a plurality of insulated, flexible conductors wound in a close helix upon the center strand, and a covering of strands enclosing the conductors and the center strand, at least one of said strands consisting of a thermoplastic material of the group consisting of polymerized vinylidene chloride and polyhexamethylene adipamide, said cord being wound in the form of a close helix with all thermoplastic strands in said core set in the forms they occupy in said helix to render the cord retractile.

9. A retractile electrical cord, which comprises a center strand composed of high tensile strength thermoplastic monofilaments, a plurality of individually insulated flexible conductors wound in a close helix upon the center strand, and a covering enclosing the conductors and center strand, said cord being coiled in a close helix with the center strand set in the form it occupies in the helix whereby the cord is caused to be retractile, said conductors extending in such a direction as to impart a predetermined degree of extensibility to the cord.

10. The method of making retractile cords, which comprises winding with a close lay upon a central strand a plurality of individually insulated conductors and applying a plurality of thermoplastic monofilaments helically about the conductors to form a flexible cord, coiling the resulting cord into the form of a close helix, heating the coiled cord to soften the monofilaments, cooling the coiled cord to set the monofilaments in the form they occupy in said helix to cause the monofilaments to act as retractile elements, and selecting the direction in which the conductors and monofilaments extend with respect to said helix so as to impart a predetermined extensibility to the cord.

11. The method of making retractile cords, which comprises winding a plurality of insulated conductors upon a flexible, thermoplastic central strand with a close lay to form a flexible cord therewith, winding the cord into the form of a close helix, and setting the flexible central strand in the position it occupies in said helix.

12. The method of making retractile cords, which comprises winding a plurality of conductors and at least one filler strand composed of monofilaments of thermoplastic material around a central strand with a close lay to form a flexible cord, coiling the resulting cord into the form of a close helix, heating the cord while it is in the shape it occupies in the helix to soften the filler strand, and cooling the filler strand to set it in the shape it occupies in the helix.

13. The method of making retractile cords, which comprises serving with a close lay upon a center cord a plurality of individually insulated conductors and at least one filler strand composed of monofilaments of thermoplastic material so that a flexible cord is formed therefrom, coiling the resulting cord into the form of a close helix, heating the cord while so coiled to soften the thermoplastic filler strand, and cooling the filler strand while so coiled to set it, whereby the filler strand tends to maintain the cord in said helical form.

14. The method of making retractile cords, which comprises serving with a close lay upon a center cord a plurality of individually insulated conductors and forming a covering comprising a monofilamentary thermoplastic material over the conductors to form a flexible cord, coiling the resulting cord into the form of a close helix, heating the covering while so coiled to soften it, and cooling the covering to set it in the position it occupies in said helix.

15. The method of making retractile cords, which comprises serving with a close lay upon a center cord a plurality of individually insulated conductors and braiding a plurality of cotton strands and strands composed of thermoplastic monofilaments over the conductors to form a flexible cord, coiling the resulting cord into the form of a close helix, heating the strands while in the form they occupy in said helix to soften them, and cooling the strands while in the form they occupy in said helix to set them in that form.

16. The method of making retractile cords, which comprises winding with a close lay upon a central strand including thermoplastic monofilaments a plurality of individually insulated conductors and at least one filler strand including thermoplastic monofilaments, braiding a plurality of strands including thermoplastic monofilaments into a covering upon the conductors and the filler strand and forming a jacket of a weatherproofing material upon the braided cover to form a flexible cord, coiling the resulting cord into the form of a close helix, and heating and cooling said cord while so coiled to set the heat-settable elements thereof in the forms they occupy in said helix.

GEORGE E. HENNING.

REFERENCES CITED

The following references are of record in the file of this patent:

UNITED STATES PATENTS

| Number | Name | Date |
| --- | --- | --- |
| 466,268 | Conner et al. | Dec. 29, 1891 |
| 571,539 | Sawyer | Nov. 17, 1896 |
| 1,739,012 | Middleton | Dec. 10, 1929 |
| 1,937,981 | Rosenthal | Dec. 5, 1933 |
| 1,977,209 | Sargent | Oct. 16, 1934 |
| 2,039,475 | Campbell | May 5, 1936 |
| 2,173,096 | Campbell | Sept. 19, 1939 |
| 2,281,542 | Barrans et al. | May 5, 1942 |
| 2,313,234 | Gavitt | Mar. 9, 1943 |
| 2,325,549 | Ryzowitz | July 27, 1943 |
| 2,348,234 | Warren, Jr. | May 9, 1944 |
| 2,392,842 | Doell | Jan. 15, 1946 |
| 2,393,058 | Pierce et al. | Jan. 15, 1946 |
| 2,394,762 | Geraty | Feb. 12, 1946 |
| 2,413,715 | Kemp et al. | Jan. 7, 1947 |
| 2,416,955 | Rosch | Mar. 4, 1947 |

FOREIGN PATENTS

| Number | Country | Date |
| --- | --- | --- |
| 104,401 | Great Britain | Mar. 8, 1917 |

OTHER REFERENCES

"Electrical World," Plastics Insulations for Conductors, Aug. 7, 1943, I-Synthetics Not Akin to Rubber, pages 53 to 55.